United States Patent

[11] 3,581,784

| [72] | Inventors | Edward C. Warrick<br>Pittsburgh, Pa.;<br>Emerson Berends, Tupelo, Miss. |
|------|-----------|---|
| [21] | Appl. No. | 871,364 |
| [22] | Filed | Nov. 21, 1969<br>Division of Ser. No. 684,437, Nov. 20, 1967, abandoned. |
| [45] | Patented | June 1, 1971 |
| [73] | Assignee | Rockwell Manufacturing Company<br>Pittsburgh, Pa. |

[54] SAW TABLE INSERT
1 Claim, 4 Drawing Figs.

[52] U.S. Cl. ................................................ 143/132
[51] Int. Cl. .................................................. B27b 5/16
[50] Field of Search ..................................... 143/132-1

[56] References Cited
UNITED STATES PATENTS

| 2,020,222 | 11/1935 | Tautz | 143/132(-6) |
| 2,776,682 | 7/1957 | Mullen | 143/132(-6)X |
| 2,873,773 | 2/1959 | Gaskell | 143/132(-6)X |

*Primary Examiner*—Donald R. Schran
*Attorney*—Strauch, Nolan, Neale, Nies & Kurz

ABSTRACT: Table saw blade opening closure plate means providing means for levelling adjustment from above the work table by the operator standing in operating position.

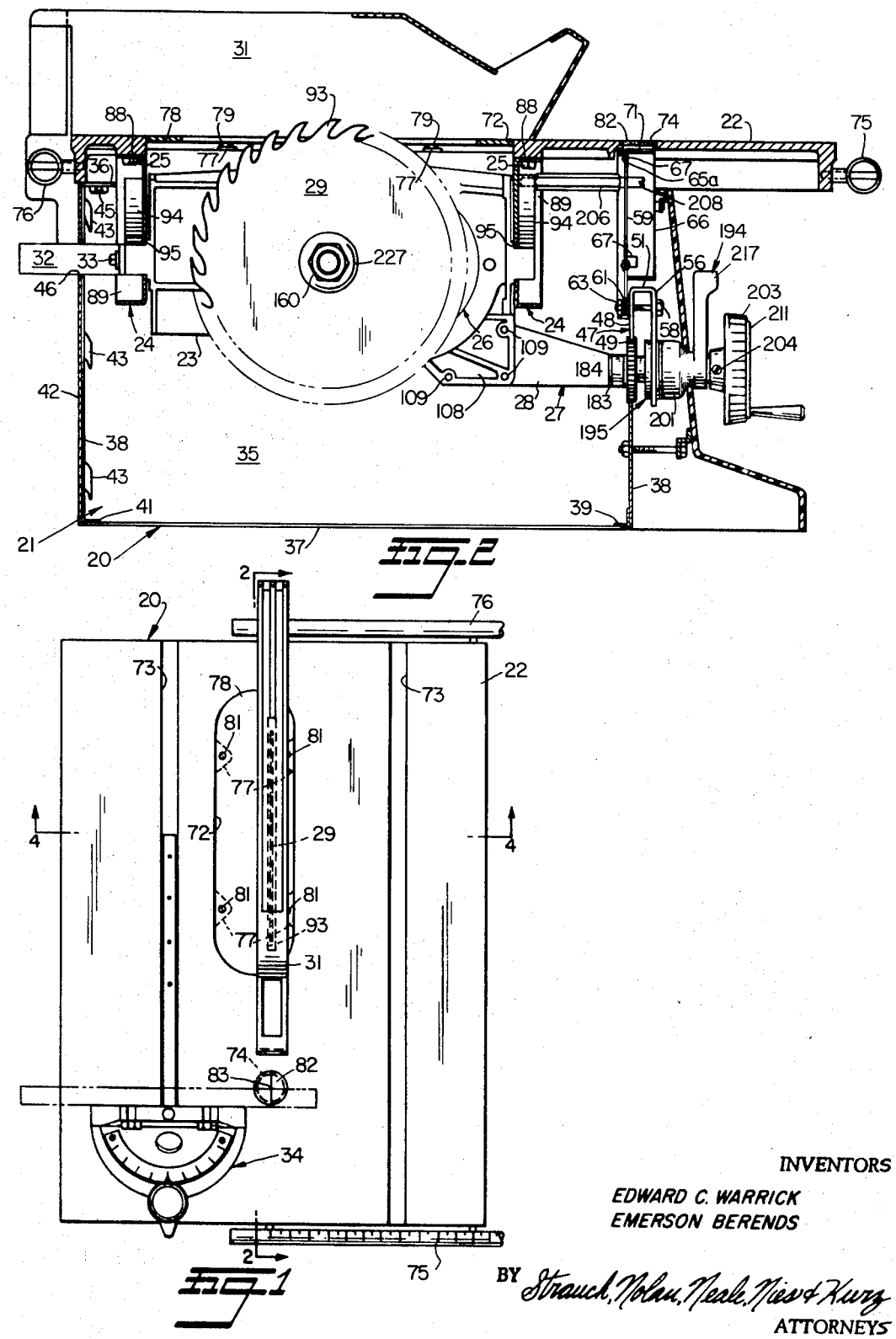

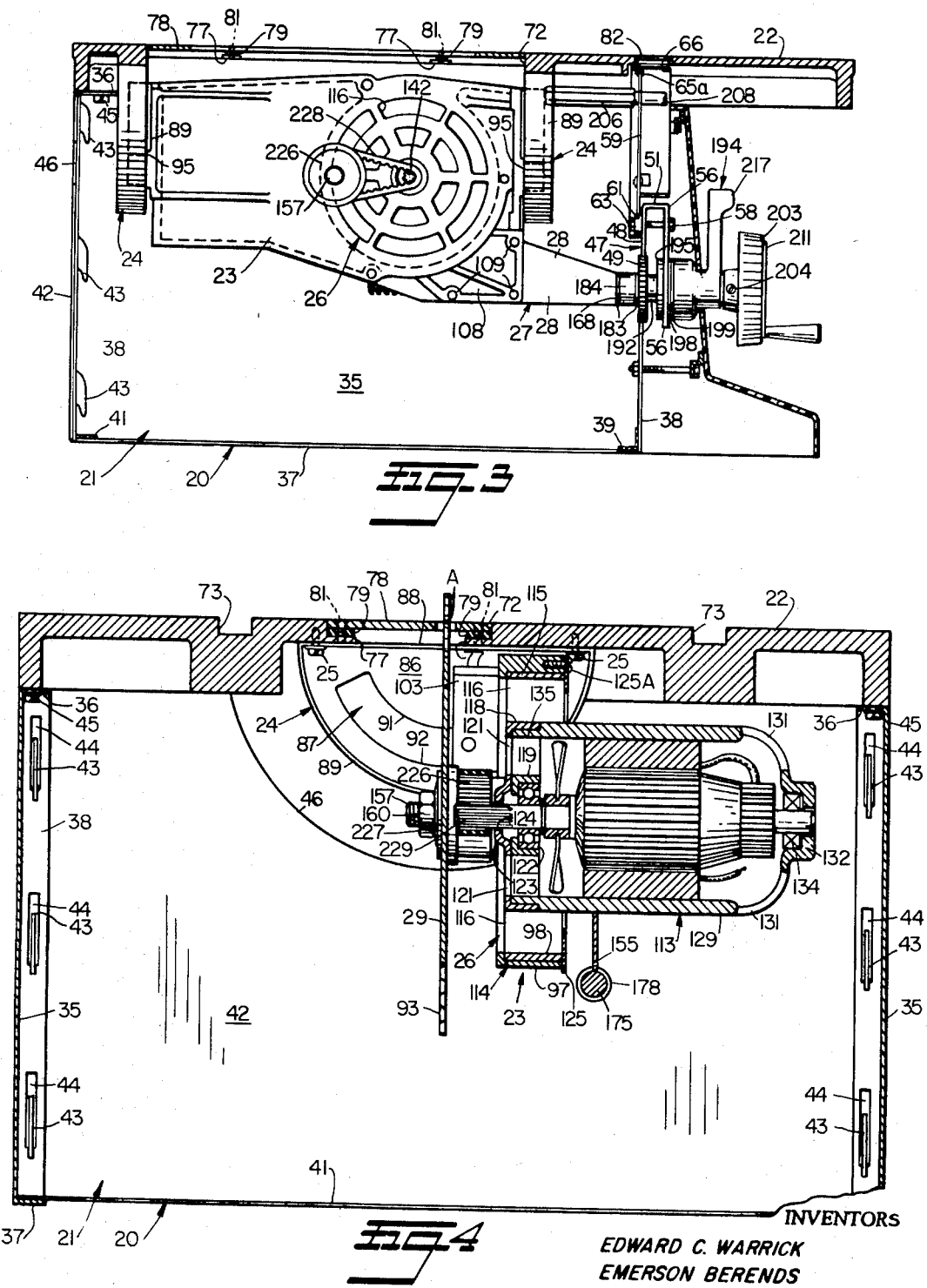

3,581,784

1

SAW TABLE INSERT

This is a division of copending application, Ser. No. 684,437 filed Nov. 20, 1967 for Motor Driven Table Saw.

BACKGROUND

This invention relates to tilting arbor bench saws and more particularly to a blade opening closure plate having means for levelling adjustment of the closure plate from the top of the table journaled assure a smooth uninterrupted work support slide surface in the region of the saw blade. Representative prior art directed to adjustable table inserts comprise U.S. Pat. Nos. 2,750,970 and 2,873,773 to W. L. Gaskell, 2,776,682 to L. S. Mullen and 2,810,412 to G. A. Roug. Representative mitre gauge prior art comprises U.S. Pat. Nos. 1,164,253 to A. G. Borntraeger, 2,356,610 to H. F. Penney and 2,873,773 to W. L. Gaskell.

SUMMARY

The primary object of the present invention resides in providing the support table blade opening with peripherally spaced, inwardly extending, support ears having tapped bores therein, providing a removable insert plate having a blade slot therein and securing screw openings aligned with the tapped bores of the support ears for closing the support table blade opening and compressible bushings interposed between the support ears and insert plate adapted, upon inserting securing screws through the plate openings and threading them into the tapped bores of the support ears, to permit levelling of the table insert with the work support surface of the saw table.

BRIEF DESCRIPTION OF THE DRAWINGS

Other objects will appear from the appended claims and following description when read in conjunction with the accompanying drawings wherein:

FIG. 1 is a top plan view of a saw embodying the present invention;

FIG. 2 is a sectional view of the saw of FIG. 1 taken substantially on line 2-2 of FIG. 1;

FIG. 3 is a sectional view similar to FIG. 2 with the saw blade removed to better illustrate the drive connection between the motor shaft and blade supporting arbor shaft; and FIG. 4 is a sectional view of the saw of FIG. 1 taken substantially on line 4-4 of FIG. 1.

DESCRIPTION OF THE PREFERRED EMBODIMENT

With continued reference to the drawings wherein like reference numerals are used throughout the several views of the drawings to indicate the same parts, the tilting arbor saw 20 of the present invention is principally composed of a support base or cabinet assembly 21 having a work support table 22 bolted thereto, a tilt bracket 23 suspended from table 22 by front and rear trunnions 24 bolted to lands formed on the table underside by bolts 25 (FIGS. 2 and 4) for tilt movement around tilt axis A (FIG. 4), a blade and arbor means 26 journaled in tilt bracket 23, tilt and raising and lowering control means 27 fixed to a sidewall of tilt bracket 23 through a control shaft support bracket 28, a circular saw blade 29, a pivotally mounted saw blade guard assembly 31 carried by a support bracket 32 bolted at 33 (FIG. 2) to the rear end of tilt bracket 23, and a mitre gauge assembly 34 (FIG. 1). As best shown in FIGS. 2, 3 and 4 support base or cabinet assembly 21 is made up of a spaced pair of side plates 35 having inturned top flanges 36, inturned bottom flanges 37, inturned end flanges 38 cross connected in opposed space relation by an angle bar 39 extending between the front ends of bottom flanges 37, a strap member 41 extending between the rear ends of bottom flanges 37 and a rear closure plate 42 interconnected to the rear end flanges 38 through L-shaped vertically spaced hangers 43 interfitted into vertical slots 44 formed in rear end flanges 38. Work support table 22 is bolted at the front and rear ends of top flanges 36 by bolts 45, the rear bolts only being shown in FIGS. 2, 3 and 4. As best seen in FIGS. 3 and 4, rear closure plate 42 at its upper center is provided with an arcuate cutout portion 45 through which the blade guard support bracket 32 extends.

The front end of support base or cabinet assembly 23 is spanned about midway of its height by a bracket member 47 bolted at its ends to inturned front end flanges 38 and composed of a backwall 48 formed at its center portion to provide an arcuate downwardly facing rack gear segment 49 (FIGS. 2 and 3) having axis A as its center and along its upper edge with a forwardly directed cross flange 51 carrying a dependent wall section 56 arcuately slotted at 57 opposite and below gear segment 49 using axis A as a center for a purpose to be presently pointed out. Dependent wall section 56 and backwall 48 at a point laterally centered with respect to their ends to lie in the vertical plane containing axis A and above slot 57 are provided with aligned passages to freely pass a cap screw 58 the inner shank end of which pivotally mounts a segment plate 59 having a journal bore through a sleeve bushing 61 and a retainer assembly including an abutment washer and nut 63. Segment plate 59 is of generally triangular configuration in plan having an arcuate edge opposite its journal bore enclosing bushing 61 provided at its other two corners with arcuately shaped screw slots adapted to receive mounting screws 65a for securing a generally arcuate tilt or bevel scale platen 66 in abutting relation to edge 64 through securing ears 67 struck out of platen 66. The upper face of platen 66 has a bevel scale plate 71 secured thereto and segment plate 59 is provided with a cam slot 70 for a purpose to be hereinafter pointed out.

Work support table 22, as best seen in FIG. 1, is provided with the customary through blade opening 72, a respective mitre gauge groove 73 at each side of blade opening 72 extending parallel to the long axis of blade opening 72 from the front edge to the rear edge of the table, and a through stepped circular sight opening 74 forwardly of blade opening 72 to be over tilt scale 71 in laterally centered relation on the tilt axis of the saw hereinafter described. The front and rear edges of the work support table are suitably drilled and tapped in customary manner to mount front and rear guide rails 75 and 76 for mounting a rip fence (not shown). Rail 75, as seen in FIG. 1, is conventionally graduated to provide a scale for accurately setting the rip fence in well-known manner. Blade opening 72 is provided along its side edges near the bottom table face with inwardly directed, tapped ears 77 for supporting a blade opening closure insert plate 78 of conventional construction. To assure proper levelling of insert plate 78 with the adjacently related table surface, the present invention employs compressible rubber bushings 79 FIG. 4 interposed between ears 77 and the underside of insert plate 78 in surrounding relation to counter sunk securing screws 81 entered downwardly through screw openings provided in insert plate 78 into tapped ears 77. As a consequence of this use of simple, inexpensive rubber bushings and downwardly directed screws 81, insert plate 78 can be fully and accurately assembled from the top of work support table 22 merely by entering screws 81 through the respective plate screw openings, the respective rubber bushings and threading them into ears 77 to compress the bushings until the upper plate surface is drawn down into the blade opening until flush with the work table surface as determined by the eye, the touch, or sliding a test block back and forth across insert plate 78. If insert plate 78 is found to be too high or too low at any point, a simple lightening or loosening of the adjacently related screw or screws 81 can be effected to adjust its level as may be necessary. Stepped sight opening 74 is fitted with a transparent lens plate 82 having an index mark 83 extending diametrically thereof to cooperate with the tilt or level scale 71 in reading the tilt angle of the saw blade as will be more fully hereinafter explained. Since it is not necessary to remove lens plate 82 to adjust the tilt scale, it is preferably factory fitted to assure its being level with the work support surface of table 22 and permanently fixed in sight opening 74 by suitably cementing or other means.

As best seen in FIGS. 2 and 4 trunnions 24, comprise one piece stampings providing a planar wall 86 arcuately slotted at 87 and a continuous edge flange right angularly related to wall 86 (FIG. 2) composed of a planar mounting flange portion 88 apertured to receive bolts 25 to secure the trunnions to table 22 and a depending arcuate flange portion 89. Arcuate slots 87 are respectively dimensioned in a radial direction to provide radially spaced elongated arcuate wall portions 91 and 92 formed as a part of a circle having as a radius the distance between the tilt axis "A" (FIG. 4) which comprises the line of intersection between the plane of the work support surface of table 22 and the median plane of saw blade 93. The respective lower wall portions 92 of trunnions 24 form tracks or rails for slidably suspending tilt bracket 23 from the underside of table 22 through arcuate trunnion protrusions 94 provided on the respective end walls of tilt bracket 23 and of complemental arcuate configuration to but of shorter length than slots 87 to assure that relative vertical movement between trunnions 24 and tilt bracket 23 is presented (see FIG. 6). To prevent relative axial movement between tilt bracket 23 and trunnions 24, the bases of protrusions 94 are peripherally enlarged to form abutment lands 95 which slidably bear upon the slot defining portions of the opposing faces of the respective trunnion walls 86. As a consequence, tilt bracket 23 is positively constrained to bodily shifting movement around tilt axis "A" to thereby vary the included angle between work support table 22 and all portions of tilt bracket 23 and any structure carried thereby.

Referring to FIG. 4, electric motor 113 includes a separately mounted motor end bell and arbor shaft support member 114 (FIG. 4) having a cylindrical rim 115 dimensioned to provide a journaled fit in bore 98 of housing 97, five inwardly directed spokes 116 and a journal boss (not shown) equiangularly spaced around the inside of rim 115 and terminating radially inwardly thereof in an annular ring formation 118, and a hub portion 119 carried by angularly spaced spider arms 121 centered with respect to spokes 116 and the journal boss. As best seen in FIG. 4, spokes 116, journal boss 117, and motor mounting ring formation 118 extend axially from one end of rim 115 to a point about midway of the length of rim 115, spider arms 121 have a minimal axial thickness and are located at said one end of rim 115, and hub portion 119 is axially coextensive with ring formation 118 and is provided with a multistepped through bore forming from right to left in FIG. 4 a seat for the front rotor shaft bearing 122, an outer bearing race abutment shoulder 123, and a rotor shaft opening 124. End bell and arbor shaft support member 114, with arbor shaft and arbor shaft bearing assembly (not shown) is held in assembled relation in bore 98 for journaled movement by a retainer ring 125 (FIG. 4) secured to housing 97 by three cap screw and lock washer assemblies 125a (FIG. 4) threaded into tapped bores of housing 97.

Motor housing 129 (FIG. 4) at one end is provided with radial spider arms 131 (preferably six equiangularly spaced) supporting a centered hub portion 132 having a concentrically related shaft bore 133 extending axially inward into an enlarged annular recess forming a bearing seat 134 while the other end is open and defined by an annular, axially directed mounting flange 135 dimensioned to enter into motor mounting ring formation 118 and provides an axially inwardly spaced annular abutment shoulder disposed to abut the rear end face of ring formation 118 when assembled as shown in FIG. 4. The front rotor shaft bearing 123 being in place in seat 122 of member 114, motor housing 129 with its rotor assembly and brush assembly in place is assembled with end bell and arbor shaft support member 114 by entering shaft 142 into front shaft bearing 123 and axially moving motor housing 129 and the assembled motor parts toward housing 97 until shaft 142 protrudes through rotor shaft opening 124 and annular mounting flange 135 is fully inserted into ring formation 118 to abut the end face of flange 135 with the opposing end face of ring formation 118. Housing 129 is then fixed to member 114 by means of a pair of long cap screws passed through the end apertures of elevating worm gear segment 155 (FIG. 4), diametrically opposed ears formed on housing 129 and threaded into blind tapped bores (not shown) in the rear face of ring formation 118 all located radially inwardly of retainer ring 125.

Arbor shaft 157, preassembled with its arbor bearing fixed against axial disassembling movement forwardly in arbor shaft bearing 158 and dimensioned to snugly fit the bore of the journal bore and is of a length just equal to the axial dimension of rim 115 and is mounted in the journal bore prior to assembly of end bell and arbor shaft bearing support member 114 in bore 98 of tilt bracket 13. Upon assembly of member 114 with arbor shaft and arbor shaft bearing in place into bore 98 from the rear of tilt bracket 13, arbor shaft 157 will pass inwardly of flange 99 to project forwardly from housing 97 and the front end face of rim 115, an arcuate segment of the outer race of the arbor bearing will engage the inner radial face of flange 99 to retain member 114 and the arbor bearing against forward axial movement respecting tilt bracket 23. Attachment of retainer ring 125 is then effected by passing it forwardly around motor housing 129 into position against the rear face of housing 97 and the rear face portion of the outer race of the arbor bearing, which protrudes rearwardly to the rear edge of rim 115, and threading screws 125a home in the tapped bores of housing 97. Ring 125, due to its end butting engagement with the rear face of rim 115 and the rear face portion of the outer race of the arbor bearing retains member 114 and the arbor bearing 128 against rearward axial movement respecting tilt bracket 23. Arbor shaft 157 is fixed against axial movement with respect to the arbor bearing by the blade drive pulley and clamping assembly 227 (FIG. 4) upon tightening clamp nut 160. To assure free angular adjusting movement of member 114 together with the arbor shaft and arbor shaft bearing. A running clearance is provided between the end faces of rim 115 and the outer arbor bearing race of bearing on the one hand and flange 99 and ring 125 on the other hand by appropriate axial dimensioning of rim 115, the arbor bearing, and journal bore 98.

With member 114 mounted in tilt bracket 23 as just described and carrying motor casing 129 and the arbor shaft and arbor shaft bearing assembly, in fixed relative position as heretofore described, worm gear segment 155 will be disposed beneath motor casing 129 in close rearwardly spaced relation to the rear face of tilt bracket 23 and its dependent mounting pad 108 and the arbor shaft will lie parallel to the coincident axes of bore 98 and member 144 for 90° clockwise movement between its normal lowered position approximately as shown in FIGS. 2 and 3 to its maximum raised position.

Tilt bracket mounting pad 108 mounts on its planar back face lying in the plane of the rear face of cylindrical housing 97 an elongated control shaft support bracket 28 of generally channel configuration in cross section formed at its inner left end with three through screw openings spaced to cooperate with tapped bores 109 of pad 108. Suitable cap screws 172 (not shown) passing freely through the screw openings and threaded into tapped bores 109 of pad 108 fixedly secure support bracket 28 to pad 108 with its end wall 168 spaced beyond pad 108 toward the open front end of base or cabinet assembly 21. Coaxial through bores in end wall 168 and the opposite end wall of bracket 28 serve as journal bores for a main control shaft 175 to provide a worm pinion 178 meshed with worm segment 156 vertically below the coincident axes of motor housing 129, member 114 and bore 98. An enlarged shaft portion is provided by shaft 175 adjacent worm pinion 178 axially spaced from shoulder 177 of a length slightly less than the spacing between the outer face of the opposite end wall and the inner face of end wall 168 is provided so a fiber wear washer may be disposed in light abutting contact between the end shoulder provided by the enlarged shaft portion remove from worn pinion 178 and the inner face of end wall 168 to assure free rotation of shaft 175 in its journal bores.

A reduced diameter shaft portion extends from the aforementioned shoulder 177 through wall 168 to a point well beyond the open front end of base or cabinet assembly 21 to mount an adjusting handwheel 211. Shaft 175 is fixed against relative axial movement with respect to support bracket 28 by a second fiber wear washer 183 and a set collar 184 assembled on the reduced shaft portion inwardly from its free end in light bearing contact with the outer face of end wall 168 and the opposing end face of collar 184 which is fixed to shaft 175 by tightening a setscrew (not shown). The reduced shaft portion is then provided with a third fiber wear washer 183 in end butting relation to a sleeve shaft 192 (FIG. 3) journaled on the inner section of the reduced shaft portion, including integral spur gear wheel 49 disposed in subjacent meshing engagement with gear segment 48 of bracket member 47. Sleeve shaft 192 terminates inwardly of the free outer end of the reduced shaft portion and mounts a clamp assembly 194 made up of a flanged clamp sleeve 195 including a reduced diameter noncircular formation dimensioned to slidingly cooperate with slot 57 of bracket member 47 and fix clamp sleeve 195 against free relative rotation on sleeve shaft 192 and a cylindrical threaded shank passing freely through slot 57 to receive wear washer 198 and a wavy spring washer 199 held in place by the internally threaded hub 201 of lock lever 217 the on the cylindrical shank. The end of sleeve shaft 192 projecting beyond the lock lever hub 201 is annularly grooved at and mounts an annularly flanged tilt handwheel 203 which is nonrotatably fixed to sleeve shaft 192 by a setscrew 204 engaged in the annular groove 202. Clockwise rotation of lever 217 advances the hub 201 axially along clamp sleeve 195 to yieldingly clampingly engage wall 56 of bracket member 47 between the clamping flange of clamp sleeve 195 and washer 198 through the intermediary of spring washer 199 and the abutting end face of lever hub 201 to arrest tilt movement of bracket 23 relative to base or cabinet assembly 23 and table 22 at any selected angular adjustment through shaft 175 and support bracket 28 carried by tilt bracket 23. When a tilt adjustment is to be made lever 217 is rotated in a counterclockwise direction to relieve the clamp pressure and tilt handwheel 203 is rotated in the desired direction. Corresponding movement of tilt scale plate 71 is assured through the provision of a cam drive pin 206 (FIGS. 2 and 3) having one end fixedly threaded into a tapped bore provided in the adjacently related trunnion protrusion 94 formed on the end of tilt bracket 23 and its other end in the form of a cylindrical tip 208 drivingly extending through cam slot 70 of pivoted segment plate 59. Zeroing adjustment of scale plate 71 may be effected by setting tilt bracket 23 to dispose blade 29 at right angles to the work support surface of table 22 determined by the application of a carpenter's hand square to the table and blade, loosening the securing screws 65a fastening bevel scale platen 66 to segment plate 59, shifting platen ears 67 and screws 65a along the screw slots of segment plate 59 until a zero reading is obtained viewing scale plate 71 through lens plate 82, and tightening screws 65a to fix platen 66 and segment plate 59 against relative movement. Since main control shaft 175 journals in sleeve shaft 192 and support bracket 27 and due to its nonreversible worm drive connection to worm gear segment 155 is self locking in any selected tilted position of the tilt bracket 23 and saw blade 29, it will be appreciated that blade raising and lowering movement can be effected at anytime merely by grasping and turning adjusting handwheel 211 nonrotatably and axially fixed to the reduced diameter end of shaft 175 by a roll pin carried in shaft 175 with its ends protruding into axial blind end grooves formed in a hub bore of handwheel 211 and a snap ring at the end of the shaft 175.

A positive drive belt 228 encompassing the pulley sheave 226 and the splined end 229 of rotor shaft 142 provides a direct drive connection between rotor shaft 142 and arbor shaft 157 and blade 29. By suitably relating the diameter of pulley sheave 226 to the diameter of the splined end of rotor shaft 142, a desired rotating speed of blade 29 is obtained. Since the motor, arbor assembly and blade, and the blade raising and lowering controls and tilt controls are all directly carried by the tilt bracket 23 and completely fixedly related around tilt bracket bore 98, an unusually accurate and rigid saw assembly conveniently arranged for adjustment and operation from a standing position at the front of the saw is provided by the structure so far described.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim and desire to be secured by Letters Patent is:

1. In a motorized table saw including a work support table having a through blade opening therein and a saw blade mounted for raising and lowering movement through said blade opening a table insert and mount for closing said opening closely around said saw blade comprising through tapped support ears extending into said blade opening at spaced intervals along the underside thereof an insert plate shaped to fit said blade opening and having a blade passage therethrough dimensioned to closely but freely pass the blade side faces and respective countersunk screw openings spaced around its edges in position to mate with the tapped openings of said ears, mounting bushings of deformable elastomeric material interposed between said ears and the opposing underside areas of said insert plate, and securing screws passing downwardly through said countersunk screw openings and said bushings into threaded engagement with said tapped support ears, said securing screws when threaded into said ears being adapted to compress said respective bushings to varying degrees necessary to yieldingly secure said insert plate in said table opening with its exposed upper face level with the work surface of said table.

UNITED STATES PATENT OFFICE
CERTIFICATE OF CORRECTION

Patent No. 3,581,784　　　　　　　　Dated　June 1, 1971

Inventor(s)　Edward C. Warrick et al.

It is certified that error appears in the above-identified patent and that said Letters Patent are hereby corrected as shown below:

Page 1 (Title page), line 7 of the first column, the word --abandoned-- should read --now, U. S. Patent No. 3,538,964, issued November 10, 1970.--.

Column 1, line 3 of the specification, after "1967" insert --now, U.S. Patent No. 3,538,964, issued November 10, 1970,--.

Column 1, line 13, change the "S" to -- C --

Column 2, line 2, change "45" to -- 46 --

Column 2, line 22, after "61" insert -- and is --

Column 2, line 63, change "lightening" to -- tightening --

Column 2, line 68, change "level" to -- bevel --

Column 3, line 17, change "presented" to -- prevented --

Column 4, line 31, change the period to a comman and change "A" to a small -- a --

Column 4, line 43, change "144" to -- 114 --

Column 4, line 58, after "175" insert -- formed --

Column 4, line 59, change "156" to -- 155 --

UNITED STATES PATENT OFFICE
CERTIFICATE OF CORRECTION

Patent No. 3,581,784      Dated June 1, 1971

Inventor(s)    Edward C. Warrick et al.     PAGE - 2

It is certified that error appears in the above-identified patent and that said Letters Patent are hereby corrected as shown below:

Column 5, line 14, insert a comma after "195"

Column 5, line 20, after "217" change "the" to -- threaded --

Signed and sealed this 15th day of February 1972.

(SEAL)
Attest:

EDWARD M. FLETCHER, JR.      ROBERT GOTTSCHALK
Attesting Officer           Commissioner of Patents